US008655749B2

(12) United States Patent  
Schweitzer et al.

(10) Patent No.: US 8,655,749 B2
(45) Date of Patent: Feb. 18, 2014

(54) METHODS AND SYSTEMS FOR DISTRIBUTING STOCK IN A DISTRIBUTION NETWORK

(75) Inventors: Michael Schweitzer, Leimen (DE); Edward W. Huber, Morton, IL (US); Marlon S. McDonald, Tremont, IL (US); Michael J. Monson, Morton, IL (US); Larry M. Newbanks, Peoria, IL (US); Gregory A. McCoy, Brimfield, IL (US); Guenther J. Baermann, Pulheim (DE); Eric P. Eich, Huerth (DE); Hans Schmitz, Euskirchen (DE); Brian R. Taylor, Leamington Spa (GB); Michael J. Czach, Canton, MI (US); Ryan G. Matthews, Livonia, MA (US)

(73) Assignee: SAP AG, Walldorf (DE)

( * ) Notice: Subject to any disclaimer, the term of this patent is extended or adjusted under 35 U.S.C. 154(b) by 1955 days.

(21) Appl. No.: 10/955,266

(22) Filed: Sep. 30, 2004

(65) Prior Publication Data

US 2006/0069598 A1    Mar. 30, 2006

(51) Int. Cl.
  *G06Q 10/00*    (2012.01)
  *G06Q 10/08*    (2012.01)

(52) U.S. Cl.
  CPC .................................. *G06Q 10/087* (2013.01)
  USPC ........................................................ 705/28

(58) Field of Classification Search
  None
  See application file for complete search history.

(56) References Cited

U.S. PATENT DOCUMENTS

| | | | | |
|---|---|---|---|---|
| 5,548,518 | A * | 8/1996 | Dietrich et al. | 700/100 |
| 5,893,076 | A * | 4/1999 | Hafner et al. | 705/28 |
| 6,249,774 | B1 * | 6/2001 | Roden et al. | 705/28 |
| 6,263,317 | B1 * | 7/2001 | Sharp et al. | 705/26.81 |
| 6,785,718 | B2 * | 8/2004 | Hancock et al. | 709/219 |
| 6,873,969 | B2 * | 3/2005 | Stone et al. | 705/5 |
| 6,885,902 | B2 * | 4/2005 | Crampton et al. | 700/99 |
| 6,898,472 | B2 * | 5/2005 | Crampton et al. | 700/97 |
| 6,901,380 | B1 * | 5/2005 | Bremers | 705/26.81 |
| 7,058,587 | B1 * | 6/2006 | Horne | 705/7.22 |
| 7,092,929 | B1 * | 8/2006 | Dvorak et al. | 705/28 |
| 7,139,637 | B1 * | 11/2006 | Waddington et al. | 700/216 |
| 7,164,959 | B2 * | 1/2007 | Huang et al. | 700/99 |
| 7,177,825 | B1 * | 2/2007 | Borders et al. | 705/26.81 |
| 7,251,612 | B1 * | 7/2007 | Parker et al. | 705/7.22 |
| 7,280,880 | B2 * | 10/2007 | Schmale | 700/97 |
| 7,353,194 | B1 * | 4/2008 | Kerker et al. | 705/29 |
| 7,373,212 | B2 * | 5/2008 | Lokowandt | 700/101 |
| 7,532,947 | B2 * | 5/2009 | Waddington et al. | 700/216 |
| 7,594,601 | B2 * | 9/2009 | Birjandi et al. | 235/376 |
| 7,636,670 | B2 * | 12/2009 | Woehler | 705/7.25 |
| 7,668,760 | B2 * | 2/2010 | Suzuki et al. | 705/28 |
| 7,672,867 | B2 * | 3/2010 | Birjandi et al. | 705/7.31 |
| 2002/0042756 | A1 * | 4/2002 | Kumar et al. | 705/26 |

(Continued)

*Primary Examiner* — Brett Feeney
(74) *Attorney, Agent, or Firm* — Finnegan, Henderson, Farabow, Garrett & Dunner LLP (57) ABSTRACT

Systems and methods are disclosed for distributing stock in a distribution network. The distribution network may include a source location and a plurality of target locations. In the disclosed systems and methods, the stock requirements of the target locations may be categorized into a plurality of requirement types, wherein each requirement type reflects a category of stock requirements for one of the target locations. In addition, the plurality of requirement types may be prioritized by order of importance and/or the plurality of target locations may be prioritized for each requirement type based on at least one sequence rule. Based on the prioritized requirement types and/or prioritized sequence of the target locations, the stock may be distributed to the plurality of target locations.

51 Claims, 6 Drawing Sheets

(56) References Cited

U.S. PATENT DOCUMENTS

| | | | |
|---|---|---|---|
| 2002/0052772 A1* | 5/2002 | Nishimoto et al. | 705/8 |
| 2002/0143598 A1* | 10/2002 | Scheer | 705/9 |
| 2002/0143669 A1* | 10/2002 | Scheer | 705/28 |
| 2002/0161674 A1* | 10/2002 | Scheer | 705/28 |
| 2003/0208392 A1* | 11/2003 | Shekar et al. | 705/8 |
| 2004/0172344 A1* | 9/2004 | Stockwell et al. | 705/28 |
| 2004/0210489 A1* | 10/2004 | Jackson et al. | 705/22 |
| 2006/0069598 A1* | 3/2006 | Schweitzer et al. | 705/8 |
| 2006/0069629 A1 | 3/2006 | Schweitzer et al. | |
| 2006/0074728 A1* | 4/2006 | Schweitzer et al. | 705/8 |
| 2006/0085244 A1* | 4/2006 | Foerster et al. | 705/8 |
| 2006/0111963 A1* | 5/2006 | Li et al. | 705/10 |
| 2006/0282346 A1* | 12/2006 | Kernodle et al. | 705/28 |
| 2007/0050069 A1* | 3/2007 | Treichler et al. | 700/99 |

\* cited by examiner

|  |  | Past | Present | | Future | |
|---|---|---|---|---|---|---|
|  |  | Past due | Period 0 | Period 1 | Period 2 | Period 3 | ... |
| Target 1 | Net requirement | 6 | 3 | 4 | 5 | 2 | ... |
|  | Cumul. net requirement | 6 | 9 (6+3) | 13 | 18 | 20 | ... |
| Target 2 | Net requirement | 7 | 6 | 8 | 7 | 3 | ... |
|  | Cumul. net requirement | 7 | 13 | 21 | 28 | 31 | ... |
| Target 3 | Net requirement | 5 | 5 | 0 | 0 | 5 | ... |
|  | Cumul. net requirement | 5 | 10 | 10 | 10 | 15 | ... |
| Target 4 | Net requirement | 16 | 1 | 1 | 5 | 2 | ... |
|  | Cumul. net requirement | 16 | 17 | 18 | 23 | 25 | ... |
| Target 5 | Net requirement | 10 | 6 | 11 | 12 | 13 | ... |
|  | Cumul. net requirement | 10 | 16 | 27 | 39 | 52 | ... |
| Sum | Cumul. net requirement | 44 | 65 | 89 | 118 | 143 | ... |

FIG. 3A

|  |  | Past due | | | | Period 0 | Period 1 | Period 2 | Period 3 | ... |
|---|---|---|---|---|---|---|---|---|---|---|
|  |  | Tier 1 | Tier 2 | Tier 3 | Tier 4 | | | | | |
| Target 1 | Net requirement | 2 | 0 | 3 | 1 | 3 | 4 | 5 | 2 | ... |
| | Cumul. net requirement | 2 | 2 | 5 | 6 | 9 | 13 | 18 | 20 | ... |
| Target 2 | Net requirement | 4 | 1 | 0 | 2 | 6 | 8 | 7 | 3 | ... |
| | Cumul. net requirement | 4 | 5 | 5 | 7 | 13 | 21 | 28 | 31 | ... |
| Target 3 | Net requirement | 0 | 3 | 1 | 1 | 5 | 0 | 0 | 5 | ... |
| | Cumul. net requirement | 0 | 3 | 4 | 5 | 10 | 10 | 10 | 15 | |
| Target 4 | Net requirement | 1 | 10 | 2 | 3 | 1 | 1 | 5 | 2 | ... |
| | Cumul. net requirement | 1 | 11 | 13 | 16 | 17 | 18 | 23 | 25 | ... |
| Target 5 | Net requirement | 3 | 0 | 0 | 7 | 6 | 11 | 12 | 13 | ... |
| | Cumul. net requirement | 3 | 3 | 3 | 10 | 16 | 27 | 39 | 52 | |
| Sum | Cumul. net requirement | 10 | 24 | 30 | 44 | 65 | 89 | 118 | 143 | ... |

FIG. 3B

|   | B | C | D | E | F |
|---|---|---|---|---|---|
|   |   |   | Tier 4 req'ments | Cumulative Tiers 1-3 req'ments | Distribution Results |
| 2 |   |   |   |   |   |
| 3 | ↑ loc. sequence | Target 1 | 1.00 | 5.00 | 6 |
| 4 |   | Target 2 | 2.00 | 5.00 | 7 |
| 5 |   | Target 3 | 1.00 | 4.00 | 5 |
| 6 |   | Target 4 | 3.00 | 13.00 | 14 |
| 7 |   | Target 5 | 7.00 | 3.00 | 3 |
| 8 |   | Sum | 14.00 | 30.00 | 35 |
| 9 |   |   |   |   |   |
| 10 |   | Available Quantity | 35 |   |   |

FIG. 3C

|  | A | B | C | D | E |
|---|---|---|---|---|---|
| 1 | < loc. sequence | | Tier 4 Cum Req/ Rnd Value | Tier 5 Cum Req/ Rnd Value | Filing % |
| 2 | | | | | |
| 3 | | Target 1 | 17 / 20 | 31 / 40 | 21.43% |
| 4 | | Target 3 | 51 / 60 | 82 / 90 | 29.03% |
| 5 | | Target 2 | 8 / 10 | 9 / 10 | 200.00% |
| 6 | | | | | |
| 7 | | | | | |
| 8 | | Sum | 76 / 90 | 122 / 140 | |
| 9 | | Available Quantity | 100 | | |
| 10 | | | | | |

FIG. 4

METHODS AND SYSTEMS FOR DISTRIBUTING STOCK IN A DISTRIBUTION NETWORK

BACKGROUND OF THE INVENTION

I. Field of the Invention

The present invention generally relates to methods and systems for distributing stock in a distribution network. More particularly, the present invention relates to methods and systems for distributing stock elements among a plurality of target locations in a distribution network.

II. Background Information

Deployment is a decision making process for moving or distributing stock in a distribution network from a source location that has stock elements to the target locations that need the stock elements. The source location may replenish the stock supply of the target locations according to each target's past due, current, or future stock requirements. Quantities deployed to any target location may be based on, for example, the target's current situation, its on-hand inventory, its forecasted demand, or its fixed requirements. The quantity of stock required by a target location may be calculated when the source location deploys the stock.

In some situations, the target locations may need more stock than the source location has available to deploy. For such cases, conventional deployment methods include distributing a deficient quantity of stock on a pro-rata basis. For example, if four target locations require four (4) parts each (which is 16 in total), but the source has only twelve (12) parts to distribute (which is three-fourth of the total requirement), conventional distribution strategies result in simply providing three-fourth of the required quantity to each target (which is 3 parts for each target). Thus, the conventional strategy is to spread the shortage out on a pro-rata basis. This often causes problems because not all targets have an equal need or requirement for the parts. In other words, the conventional strategy ignores the fact that some target locations may have a more urgent need for the stock than other target locations.

In view of the foregoing, there is a need for methods and systems for deploying stock more optimally among target locations in a distribution network. Furthermore, there is a need for optimally deploying stock when an insufficient quantity of deployable stock exists to meet the requirements for all of the target locations.

SUMMARY OF THE INVENTION

Consistent with embodiments of the present invention, systems and methods are disclosed for optimally distributing stock in a distribution network. As disclosed herein, the distribution network may comprise a plurality of target locations and at least one source location for supplying stock to the target locations. Systems and methods are also disclosed for distributing stock when a source location does not have a sufficient quantity of deployable stock to meet the requirements for all of the target locations.

In accordance with one embodiment, a method for distributing stock to a plurality of target locations is provided, wherein each target location has a corresponding stock requirement. The method may comprise: categorizing the stock requirements into a plurality of requirement types, wherein each requirement type reflects a category of stock requirements for one of the target locations; prioritizing the plurality of requirement types by order of importance; prioritizing the plurality of target locations for each requirement type based on at least one sequence rule; and distributing the stock to the target locations based on the prioritized requirement types and the prioritized sequence of the target locations.

According to another embodiment, a system for distributing stock to a plurality of target locations is provided, wherein each target location has a corresponding stock requirement. The system may comprise: a component for categorizing the stock requirements into a plurality of requirement types, wherein each requirement type reflects a category of stock requirements for one of the target locations; a component for prioritizing the plurality of requirement types by order of importance; a component for prioritizing the plurality of target locations for each requirement type based on at least one sequence rule; and a component for determining the distribution of the stock to the target locations based on the prioritized requirement types and the prioritized sequence of the target locations, such that the stock requirements are fulfilled from the highest priority requirement type to the lowest priority requirement type and, for each prioritized requirement type, the stock requirements are fulfilled from the highest priority target location to the lowest priority target location.

In accordance with yet another embodiment, a computer-readable medium is provided that comprises a set of instructions which when executed perform a method for distributing stock to a plurality of target locations, wherein each target location has a corresponding stock requirement. The method executed by the set of instructions may comprise: categorizing the stock requirements into a plurality of requirement types, wherein each requirement type reflects a category of stock requirements for one of the target locations; prioritizing the plurality of requirement types by order of importance; prioritizing the plurality of target locations for each requirement type based on a sequence rule; and determining a distribution of the stock to the target locations based on the prioritized requirement types and the prioritized sequence of the target locations, such that the stock requirements are fulfilled from the highest priority requirement type to the lowest priority requirement type and for each prioritized requirement type, the stock requirements are fulfilled from the highest priority target location to the lowest priority target location.

In accordance with yet another embodiment, a method is provided for distributing stock from a source location to a plurality of target locations, wherein each target location has a corresponding stock requirement. The method may comprise: categorizing, for each target location's stock requirement, the types of stock requirements for the target location, wherein each requirement type reflects a category of stock requirements for the respective target location; determining a prioritized order of the requirement types of the target locations and determining a prioritized order of the target locations for each requirement type; and distributing the stock to the target locations based on the prioritized requirement types and the prioritized sequence of the target locations.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention manage the deployment of stock in a distribution network. The distribution network may comprise a source location from which the stock is deployed and one or more target locations to which the stock is deployed. As used herein, the term "stock" refers to any element or quantity of stock that is deployed to a target location. By way of example, a stock element may comprise a part for manufacturing or providing a finished product, or an element or part that is used for providing services. Stock elements may also comprise commercial products or items, such as books, office supplies, articles of clothing, electronic devices, home appliances or other merchandise.

Systems and methods consistent with the invention may be implemented to optimally distribute stock elements to target locations in a distribution network. For example, the invention may be used when the quantity of deployable stock is not sufficient to meet the stock requirements of all target locations. In such cases, stock distribution systems and methods consistent with the invention may determine an optimum allocation of the stock elements among the target locations.

As described below, an exemplary embodiment of the invention is directed to systems and methods for distributing stock from a source location to a plurality of target locations. The source location may distribute stock to one or more target locations and each target location may further distribute stock to other target locations. Each target location may have corresponding stock requirements that may be categorized into different requirement types. Distribution systems and methods consistent with the invention may then prioritize the different requirement types and/or apply at least one sequence rule to prioritize the order of distribution to the target locations for each requirement type. In one embodiment, stock is distributed to the plurality of target locations according to each target's stock requirements. More particularly, the stock elements may be distributed to the target locations based on a distribution schedule set in accordance with the prioritized requirement types and/or the prioritized sequence of the target locations.

In accordance with another embodiment, a system is provided for distributing stock to a plurality of target locations. In the distribution system, each target location has a corresponding stock requirement. The system may comprise: a component for categorizing the stock requirements into a plurality of requirement types, wherein each requirement type reflects a category of stock requirements for one of the target locations; a component for prioritizing the plurality of requirement types by order of importance; a component for prioritizing the plurality of target locations for each requirement type based on at least one sequence rule; and a component for determining the distribution of stock to the target locations based on the prioritized requirement types and the prioritized sequence of the target locations, such that the stock requirements are fulfilled from the highest priority requirement type to the lowest priority requirement type and, for each prioritized requirement type, the stock requirements are fulfilled from the highest priority target location to the lowest priority target location.

Figure 1:
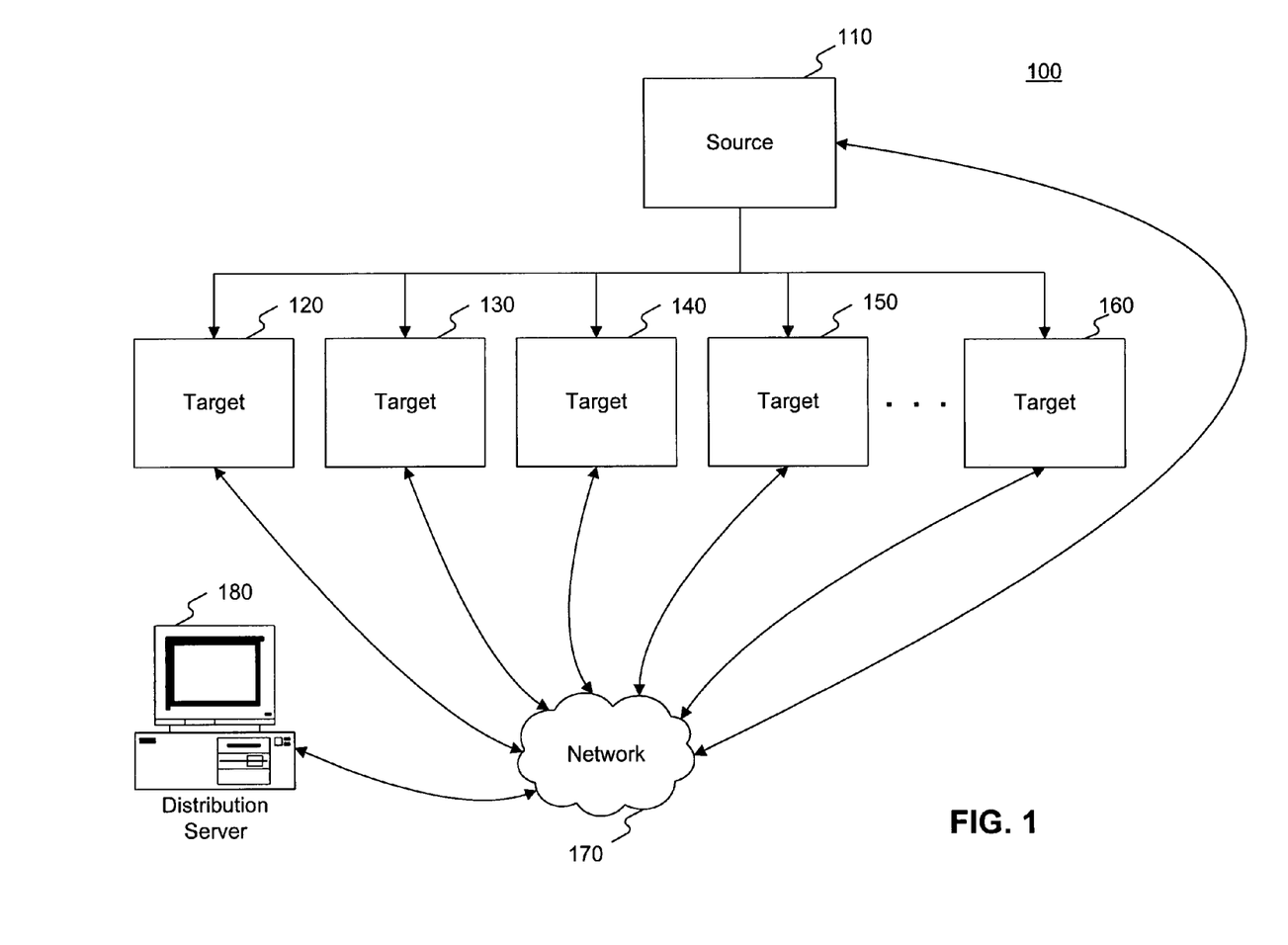
FIG. 1 is block diagram of an exemplary stock distribution network, consistent with an embodiment of the present invention.

Consistent with an embodiment of the present invention, the aforementioned components may be implemented in a distribution system, such as the exemplary distribution system 100 of FIG. 1. Any suitable combination of hardware, software and/or firmware may be used to implement these components. By way of example, the components may be implemented with a distribution server 180 in combination with distribution system 100. The aforementioned system and server are exemplary and other networks and servers may comprise the aforementioned components, consistent with embodiments of the present invention.

As shown in FIG. 1, stock distribution system 100 may include a source location 110, a plurality of target locations 120 to 160, and a distribution server 180. Source location 110 and target locations 120 to 160 may be geographically dispersed (remote or far) locations. To facilitate communication, locations 110 to 160 and distribution server 180 may be interconnected via a communications network 170. To move and distribute stock items from source location 110 to target locations 120 to 160, conventional delivery or transport equipment may be used, such as fork-lifts, delivery trucks, transport planes, and/or sea transporters (not shown). The control of the movement and transport of stock items may be coordinated through operation of distribution server 180. As will be appreciated from the disclosure hereof, stock distribution network 100 is exemplary and networking arrangements other than that shown in FIG. 1 may be used to implement systems and methods consistent with the present invention. For example, while FIG. 1 shows only one source location 110 and only five target locations 120-160, the invention may be used with any number of source and respective target locations.

Consistent with the invention, source location 110 may comprise any type of source location that supplies stock elements for distribution, such as a bulk warehouse, a distribution center, a factory, or any other facility or entity that supplies stock elements. As stated above, stock from source location 110 is distributed to one or more of target locations 120 to 160. Conventional delivery or transport equipment (not shown) may be used to distribute the stock elements to target locations under the control and instructions of distribution server 180. Target locations 120 to 160 may comprise any type of target location, such as warehouses, retail stores, distribution centers, bulk warehouses, factories, or any other facility or entity that may receive stock elements. In distribution network 100, various types of stock elements may be distributed to target locations 120 to 160. As described above, a stock element may comprise a part for manufacturing or providing a finished product, an element or part that is used for providing services, or any type of commercial products or items. Examples of stock elements include books, office supplies, articles of clothing, electronic devices, home appliances, as well as automotive parts, engine parts, or heavy equipment parts.

Distribution server 180 may communicate with source location 110 and target locations 120 to 160 via network 170. Data communicated via network 170 may include the stock requirements of each target location. Based on this data, distribution server 180 may determine the distribution of stock from source location 110 to target locations 120 to 160. For this purpose, distribution server 180 may be adapted to implement stock distribution methods consistent with the present invention. To illustrate the stock distribution methods and processes that may be implemented with server 180, exemplary embodiments are described below with reference to FIGS. 2 and 3A-3C.

Distribution server 180 may be implemented using a personal computer, workstation, network computer, mainframe, or any other similar computer-based system. Distribution server 180 may also comprise or be implemented with any type of computer-operating environment, such as hand-held devices, multiprocessor systems, microprocessor-based or programmable sender electronic devices, minicomputers, mainframe computers, and the like. Distribution server 180 may also be practiced in distributed computing environments where tasks are performed by distributed or remote processing devices. Furthermore, distribution server 180 may comprise a mobile terminal, such as a smart phone, a cellular telephone, a cellular telephone utilizing wireless application protocol (WAP), personal digital assistant (PDA), intelligent pager, portable computer, hand held computer, conventional telephone, or facsimile machine. The aforementioned systems and devices are exemplary only and distribution server 180 may comprise other systems or devices.

Distribution server 180 may be located at source location 110, one of target locations 120 to 160, or in any other facility, including distribution centers, bulk warehouses, or a central office. Moreover, distribution server 180 may be operated by, for example, a distribution network operator, a warehouse manager, or any other person or entity. It can be appreciated that distribution server 180 may be located at a variety of places and operated by a variety of people.

Network 170 may comprise, for example, a local area network (LAN) or a wide area network (WAN). Such networking environments are commonplace in offices, enterprise-wide computer networks, intranets, and the Internet, and are known by those skilled in the art. When a LAN is used as network 170, a network interface located at distribution server 180 may be used to connect distribution server 180 to source location 110 and target locations 120 to 160. When network 170 is implemented in a WAN networking environment, such as the Internet, distribution server 180, source location 110, and target locations 120 to 160 may typically include an internal or external modem (not shown) or other means for establishing communications over the WAN. Further, in utilizing network 170, data sent over network 170 may be encrypted to insure data security by using known encryption/decryption techniques.

In addition to utilizing a wire line communications system as network 170, a wireless communications system, or a combination of wire line and wireless may be utilized as network 170 in order to, for example, exchange web pages via the Internet, exchange e-mails via the Internet, or for utilizing other communications channels. Wireless can be defined as radio transmission via the airwaves. However, those skilled in the art will appreciate that various other communication techniques can be used to provide wireless transmission, including infrared line of sight, cellular, microwave, satellite, packet radio and spread spectrum radio. Distribution server 180 in the wireless environment can be any mobile terminal, such as the mobile terminals described above. Wireless data may include, but is not limited to, paging, text messaging, e-mail, Internet access and other specialized data applications specifically excluding or including voice transmission.

Distribution system 100 may also transmit data by methods and processes other than, or in combination with, network 170. These methods and processes may include, but are not limited to, transferring data via, diskette, CD-ROM, facsimile, conventional mail, an interactive voice response system (IVR), or via voice communications over a publicly switched telephone network.

Figure 2:
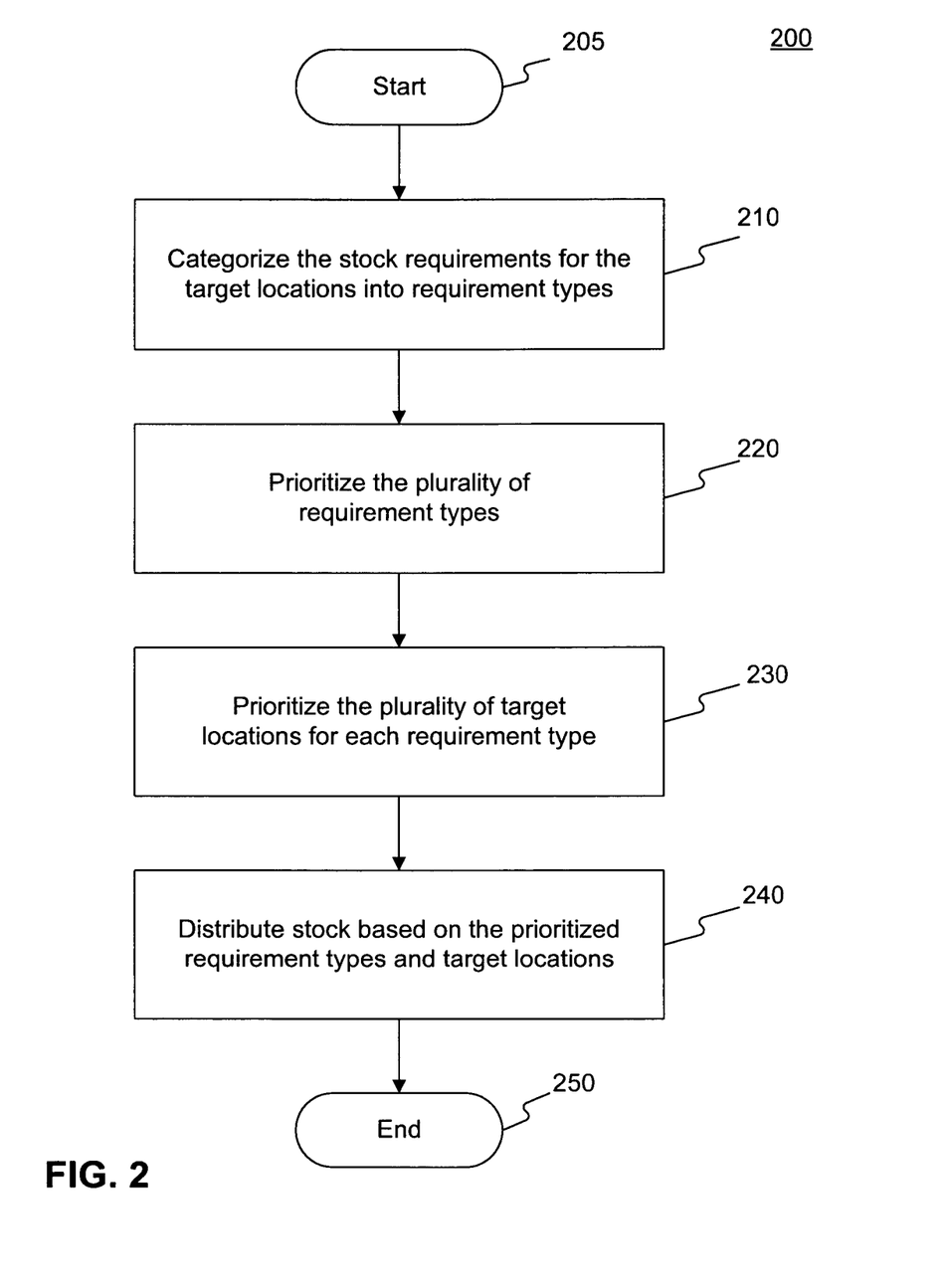
FIG. 2 is a flow chart of an exemplary method for distributing stock elements, consistent with an embodiment of the present invention.

FIG. 2 is a flow chart of an exemplary method 200 for distributing stock elements. As described in more detail below, method 200 may be used under various conditions to determine the optimum distribution of stock, including when a source location does not have enough stock to meet the requirements of all target locations. Referring to FIG. 2, method 200 begins at starting block 205, where a source location has a quantity of stock to distribute to a plurality of target locations. Each target location may have a corresponding stock requirement based on its current inventory situation, including, for example, its on-hand inventory, future due material (material that is expected to arrive in the near future), back-ordered parts, forecasted demand, and/or fixed requirements.

At stage 210, distribution server 180 may determine the types of stock requirements of each target location and then categorize those requirements into requirement types. Each requirement type may, for instance, reflect a category of stock requirements maintained by the target location. For example, a target location may have one or more of the following types of stock requirements: (1) the target location's stock requirements to fulfill backorders; (2) the target location's fixed stock requirements having a high priority; (3) the target location's forecasted stock requirements over lead time (e.g., the time required for a stock item to reach the target from the source location); (4) the target location's safety stock requirements; (5) the target location's non-priority fixed requirements over lead time; (6) the source location's safety stock planned for at the target location; (7) the source location's requirements; and/or (8) the target location's economic order quantity over the lead time. As will be appreciated by those skilled in the art, these requirement types are only exemplary and other requirements may be used depending upon the needs or requirements of the particular stock distribution environment. Also the priority sequence of each requirement type may be altered. For instance, a stock distribution system may not need to use all of the above requirement types or may use requirement types different than those listed above.

At stage 220, distribution server 180 may prioritize the different requirement types for the target locations. For example, server 180 may determine a prioritized order of the requirement types according to a predefined scheme, such as a stored priority scheme. According to one exemplary embodiment, server 180 may prioritize the requirement types in a predefined order, such as the order (1)-(8) listed above in the discussion of stage 210. In this exemplary case, a target's back-order requirements have a higher priority over its safety stock requirements. However, as stated above, alternative embodiments may use a lesser number of requirement types for a particular distribution environment. Thus, distribution server 180 may determine that the order of importance of each target's stock requirements are as follows: (1) backorders held by the target location; (2) high priority fixed requirements; (3) forecasted demand over lead time; and (4) safety stock. As stated above, other priority schemes may be used depending upon the needs or requirements of the particular stock distribution environment. Additionally, or alternatively, in stage 230, distribution server 180 may prioritize the target locations for each requirement type. For example, with respect to the embodiment of FIG. 1, server 180 may determine to distribute stock from source location 110 to the target locations in the following order of importance: first target 120, second target 130, third target 140, fourth target 150, and fifth target 160. Server 180 may also determine each target's order of priority for each requirement type. In other words, the order of priority among the target locations may differ for each requirement type. Thus, each requirement type may have a corresponding priority order dictating how the stock is to be distributed among the target locations to fulfill the requirements of that requirement type.

In one embodiment, distribution server 180 may prioritize or sort the target locations for each requirement type by using one or more sequence rules. Sequence rules may be predefined and stored by distribution server 180. Each sequence rule may define criteria for determining the priority between target locations for receiving distributed stock. Sequence rules used to sort the targets may include, for example, one or more of the following: (a) a forecasted amount of stock required by the target location beyond the lead time; (b) the lead time for the target location; (c) demand per day at the target location; (d) a predefined sequence order for the target location; (e) the proportional basis of the target location's fixed requirement quantity daily rate (i.e., the target's fixed requirements divided by its forecasted requirements); (f) the proportion basis of the target's safety stock daily rate (i.e., the target's safety stock divided by its forecasted requirements); and/or (g) a fill percentage that may consider the proportion of available quantity (due to rounding effects or available inventory) divided by the actual requirements. The fill percentage may also be used in conjunction with a fair share calculation and is described in more detail below with respect to FIG. 4.

Distribution server 180 may use a particular sequence rule for each requirement type to prioritize or sort the target locations for that requirement type. If the deployable quantity is only sufficient to cover all target locations' requirements up to a certain requirement type, then the sequence rule, which was assigned to that certain requirement type, may be applied. In other words, server 180 may use a different sequence rule for each requirement type to sort the target locations. When a sequence rule does not adequately determine which target location has a higher priority (e.g., two target locations have the same forecasted amount of stock requirements beyond the lead time), server 180 may use another sequence rule to determine the relative priority between the two target locations. To this end, server 180 may use a predefined order of sequence rules that are applied to finally determine the prioritize order of the target locations. For instance, server 180 may require that sequence rule (a) above is first used to determine the order of the target locations and then use sequence rule (c) if necessary to resolve any ambiguities between the relative priorities.

As a further illustration, distribution server 180 may use sequence rules (a), (b), (c), and (d) described above. Table 1 below illustrates exemplary sets of sequence rules that server 180 may use for certain requirement types. As indicated in the example of Table 1, more than one sequence rule may be used for each requirement type to resolve any ambiguities. For example, server 180 may use sequence rule (c) for requirement type (1), and use sequence rule (a) for this same requirement type if sequence rule (c) does not adequately resolve the priorities amongst the target locations.

TABLE 1

| Requirement Type | Sequence Rule(s) |
| --- | --- |
| 1 | c and a |
| 2 | b and c |
| 3 | d |
| 4 | a and b |

After prioritizing the plurality of requirement types and/or the target locations for each requirement type (stages 220 and/or 230), method 200 proceeds to stage 240 where the quantity of stock is distributed to the target locations. According to one embodiment, distribution server 180 may first control distribution of the stock to meet the requirements for the requirement type having the highest priority (as determined in stage 220). Further, when doing so, server 180 may allocate the stock according to the prioritized order of the target locations for that requirement type (as determined in stage 230). Upon satisfying all of the requirements for the requirement type having the highest priority, server 180 may then distribute stock for the requirement type having the next highest priority. Again, server 180 allocates the stock of this requirement type among the target locations according to the prioritized order of the target locations for this requirement type. In this way, server 180 distributes the stock until it exhausts the supply stock of source location 110.

Furthermore a "pack stage rounding algorithm" may be used with embodiments of the current inventions that calculates distribution quantities. One goal of this rounding algorithm is to achieve transportation quantities that facilitate handling at a supplier, packager, in transportation, or in a warehouse, for example. The rounding algorithm may convert an ungrounded quantity into multiples of pack stages (package sizes). For example, package sizes may comprise:

1 (=single piece)
10 (=1 carton=10 pieces)
50 (=1 overpack=5 cartons=50 pieces)
5000 (=1 pallet layer=100 over-packs=500 cartons=5000 pieces)
50000 (=1 pallet=10 pallet layers= . . . )

High pack stages may be achieved, since it may be easier and more efficient to handle whole pallets rather than single pieces. The rounding algorithm may contain location sequence logic, for example, locations earlier in the sequence are more likely to get "better" rounding results (e.g. higher pack stages rather than single pieces and deployment quantities that are closer to their requirements when the deployable quantity is to small to cover the requirements of all target locations). The processing sequence may include the ungrounded deployment quantities being calculated according to the logic as mentioned above (e.g. i) fair share—if there is enough material for all target locations; or ii) tier processing—considering requirements priorities, if the deployable quantity is not sufficient for all target locations). The processing sequence may next include those ungrounded are rounded by a "rounding to transportation quantities algorithm". Here, the sequence rules, which determine the target location sequence, may come into play. Accordingly, the distribution as calculated before may be altered (or optimized) to a certain extend in order to achieve efficient transportation quantities.

As will be appreciated from the disclosure hereof, the distribution of stock is not limited to the above-described prioritization based on requirement type and target location. Any combination of prioritization schemes or individual priority rules may be employed. For instance, in another embodiment, distribution may be performed strictly according prioritization of the target locations. In such an embodiment, stock from a source location is first distributed to the highest priority target location, making sure that all of the stock requirements of that location are satisfied, before distributing stock to the next highest priority location. This process may be repeated for each target location until all stock from the source location is depleted. In another embodiment, prioritization based on the target locations and requirement types is used to control the distribution of stock, wherein the prioritization of requirement types is specific to each target location. Thus, in this embodiment, stock is first distribute to the highest priority target location, with the stock being distributed to that location according to the specific prioritization of the requirement types for that location. Distribution in this manner may proceed through the target locations until all of the stock from the source location is depleted.

Figure 3A:
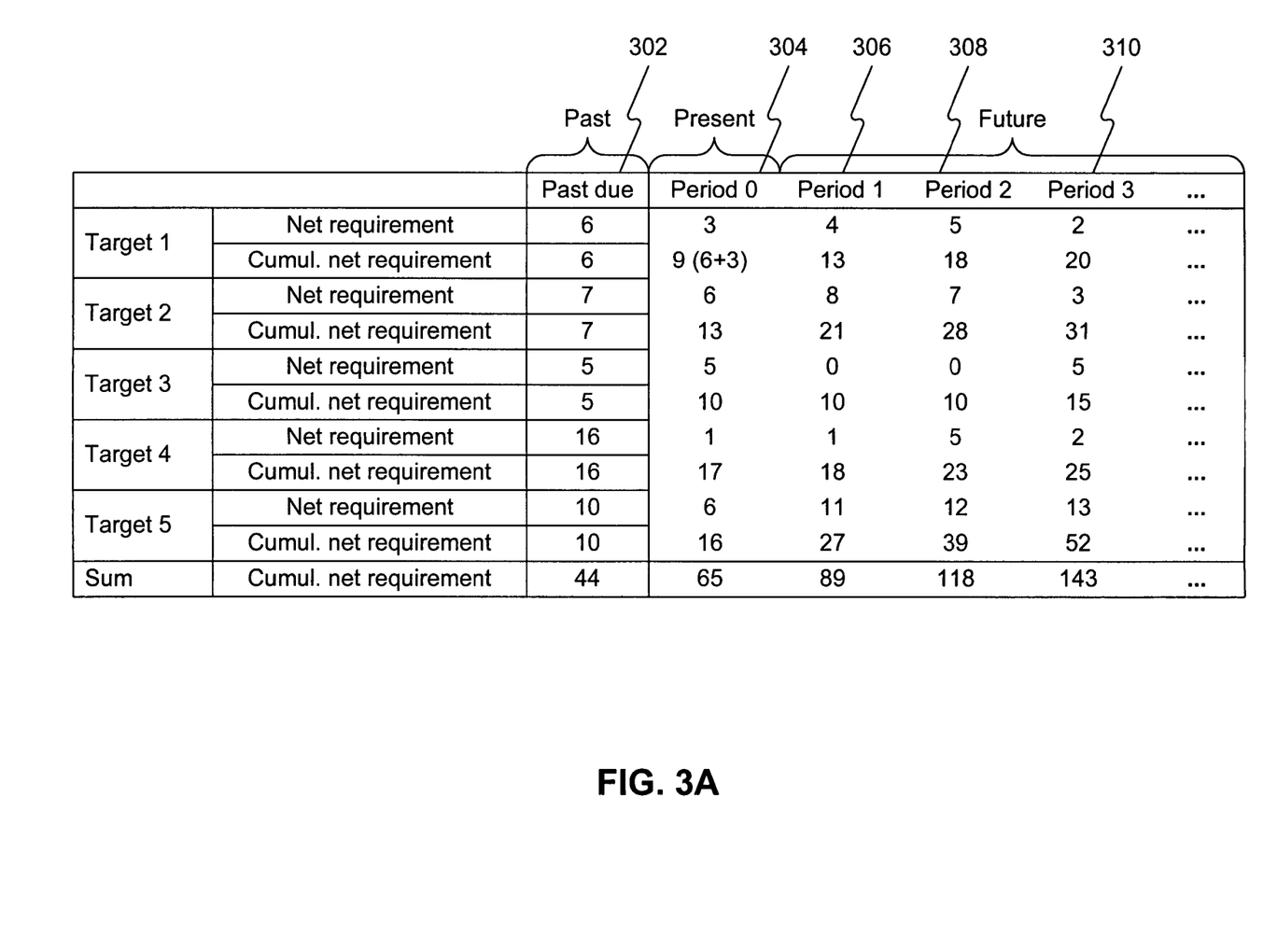
FIGS. 3A, 3B and 3C illustrate an exemplary implementation of the stock distribution method, consistent with an embodiment of the present invention.
Figure 3B:
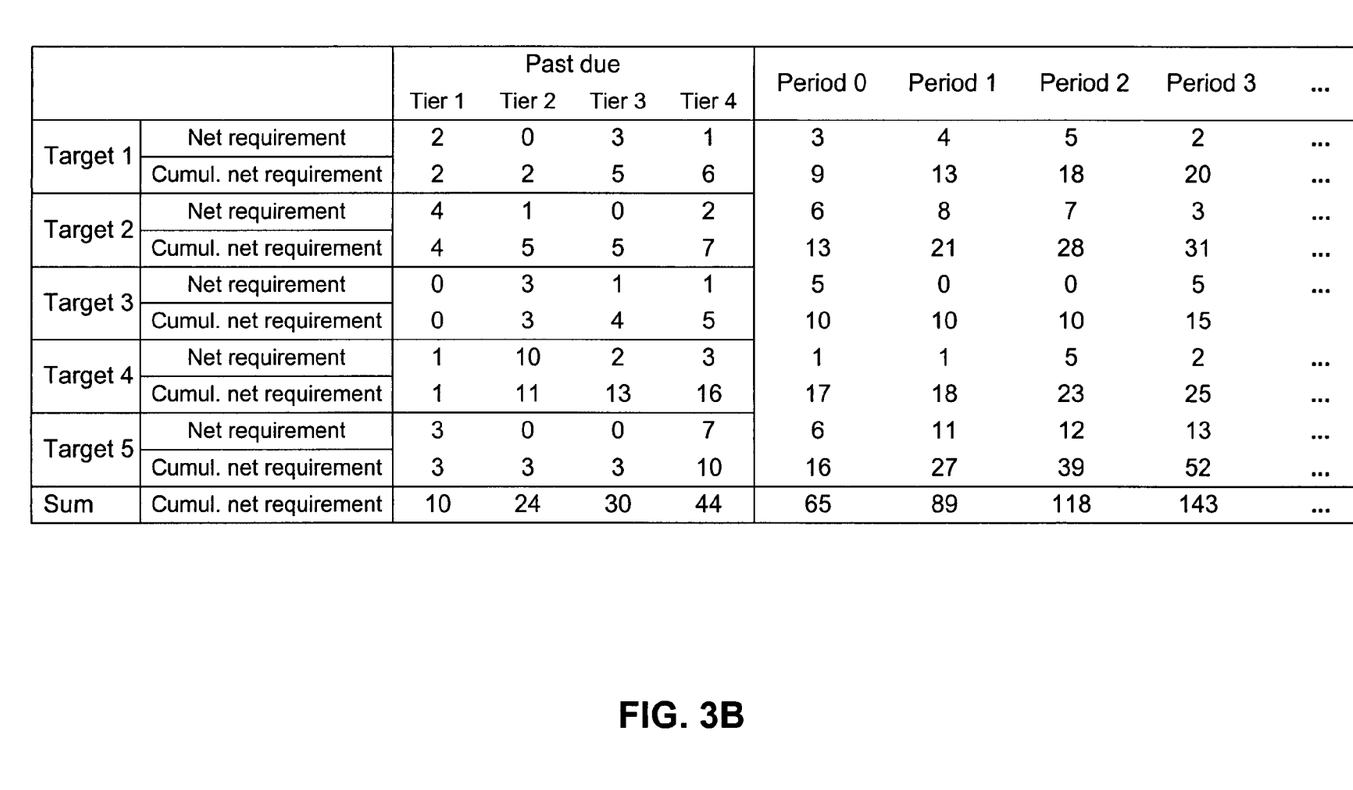
Figure 3C:
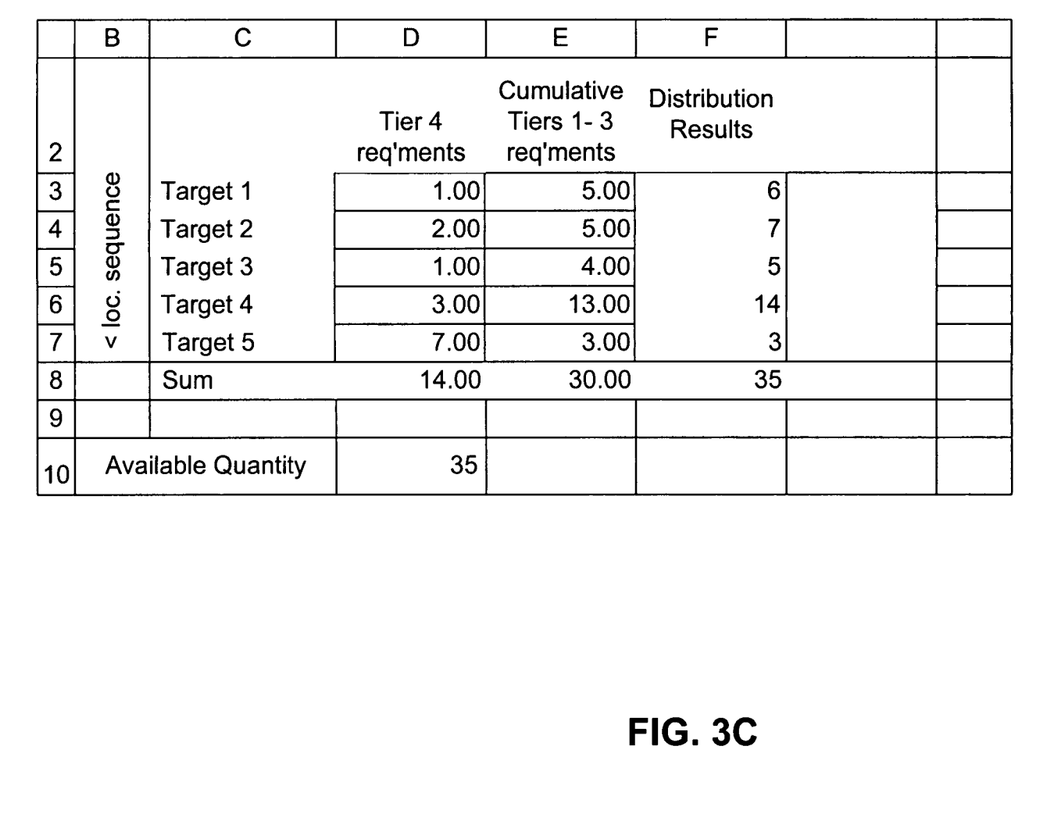

To further illustrate embodiments consistent with the invention, FIGS. 3A, 3B, and 3C provide another exemplary implementation of a stock distribution process. The features of FIGS. 3A-3C may be implemented in connection with the distribution system of FIG. 1. In this example, source location 110 may supply stock to the first through fifth target locations 120 to 160, as shown in FIG. 1. FIG. 3A illustrates how each target location may have a past due, present, and future net requirements. These requirements may be communicated to distribution server 180 via network 170 on, for example, a periodic or scheduled basis. Data corresponding to the requirements for the target locations may be organized and stored in a relational database or table by distribution server 180. For instance, a past due column 302 may contain the past due net requirements for first target 120, second target 130, third target 140, fourth target 150, and fifth target 160, respectively. A present ("Period 0") requirement column 304 may represent the current requirements of the target locations, while columns 306, 308, and 310 may represent requirements of future time periods (i.e., "Period 1," "Period 2," and "Period 3"). The time periods may, of course, refer to any time period, such an hour, a day, week, or month, for example.

Distribution server 180 may distribute stock by first fulfilling the past due requirements, followed by the present requirements (e.g. Period 0) and then by the future requirements (e.g., Periods 1, 2, and 3). Further, as shown in FIG. 3A, server 180 may cumulate the net requirements over each of the prior time periods to better determine how many requirements of the target locations can be fulfilled at a given time period with a given available quantity of stock from the source location. For instance, FIG. 3A shows the cumulative requirements at each time period for each target location, as well as the cumulative requirements at each time period for all target locations. Thus, for example, if source location has seventy (70) stock elements available for distribution, server 180 may quickly determine that 70 stock elements is sufficient to fulfill the complete requirements for all targets through Period 0, since the total cumulative requirement through Period 0 is only sixty-five (65) stock elements. 5 stock elements would be left to cover partly Period 1 requirements.

As a further illustration of the example of FIG. 3A, if source location 110 has eight-nine (89) elements of stock to distribute, then it can fulfill all of the requirements for all of the targets through Period 1. However, if source 110 has only seventy (70) stock elements available, then it can fulfill all of the past due and present requirements, but only a fraction of those for Period 1. Further, if source location 110 cannot meet all of the past due requirements for targets 120 to 160 (i.e., forty-four (44) stock elements), then a shortfall situation exists and server 180 will need to apply special rules (e.g., as described above with respect to FIG. 2) to determine the appropriate allocation amongst the targets. When a shortfall situation exists, the requirements may be broken into individual requirements types. Server 180 may separate the requirements into requirement types for the time period that cannot be fully met. For instance, if source 110 has only seventy (70) stock elements to distribute, the requirements for Period 1, column 306, then a fair share calculation (as described above) may be used to determine how to allocate the five (5) stock elements remaining after satisfying the requirements of Period 0, column 304.

FIG. 3B illustrates an exemplary embodiment of separating the past due requirements into requirement types for when the quantity of stock cannot fulfill all of the past due requirements. As shown in the example of FIG. 3B, different requirement types may be prioritized into "Tiers." For example, distribution server 180 may determine that the order of importance of each target location's stock requirements are as follows: (1) backorders held by the target location; (2) high priority fixed requirements; (3) forecasted demand over lead time; and (4) safety stock. Using this priority scheme as an example, these requirement types may respectively be referred to as Tier 1, Tier 2, Tier 3, and Tier 4 requirement types, as shown in FIG. 3B. In one embodiment, to facilitate processing, the structure and priority of the Tiers may be predefined and stored by distribution server 180.

In systems and methods consistent with the invention, however, different sequence rules may be used for each requirement type, which may possibly result in a different prioritized sequence for each requirement type. In any case, since server 180 has prioritized the target locations in the order of which target location's requirements will be fulfilled first, the first targets in the sequence (e.g., target location 120) are more likely to have their requirements met than the targets at the bottom of the sequence (e.g., target 160).

Assuming, for example, source location 110 has thirty-five (35) stock elements to distribute, distribution server 180 may then determine which requirements may be met. As shown in FIG. 3B, server 180 may quickly determine from the cumulative requirements that with thirty-five (35) stock elements it may satisfy the requirements of Tiers 1 to 3 for all target locations. Five (5) elements of stock would remain, which server 180 would determine how to allocate amongst target locations 120 to 160 to meet the requirements of Tier 4. Since, as described above, server 180 has prioritized the target locations in the order of which target's Tier requirements will be fulfilled first, server 180 may allocate the remaining five stock elements according to the sequenced order of the target locations.

FIG. 3C illustrates an example of how distribution server 180 may distribute the remaining five (5) stock elements to the target locations to fulfill the requirements of Tier 4. As mentioned above, application of the appropriate sequence rule in this example results in the targets sequenced in the following prioritized order: first target 120, second target 130, third target 140, fourth target 150, and fifth target 160. As shown in the example of FIG. 3C, server 180 may thus attempt to fulfill each target location's Tier 4 requirements (column D) according to this prioritized order. This results in completely satisfying the Tier 4 requirements of first target 120 (one stock element), second target 130 (two stock elements), and third target 140 (one stock element). The last stock element (one stock element) will then be distributed to fourth target 150. Thus, fourth target 150 will not receive its complete Tier 4 requirements of three stock elements, and fifth target 160 will not receive any stock towards its seven stock element Tier 4 requirements because the remaining five (5) stock elements have been completely exhausted. In other words, according to the above exemplary embodiment of the invention, fifth target 160 would not receive any stock towards its Tier 4 requirements unless source 110 could completely satisfy the Tier 4 requirements of fourth target 150. Column F shows the total stock element quantities distributed to each target in this example.

Figure 4:
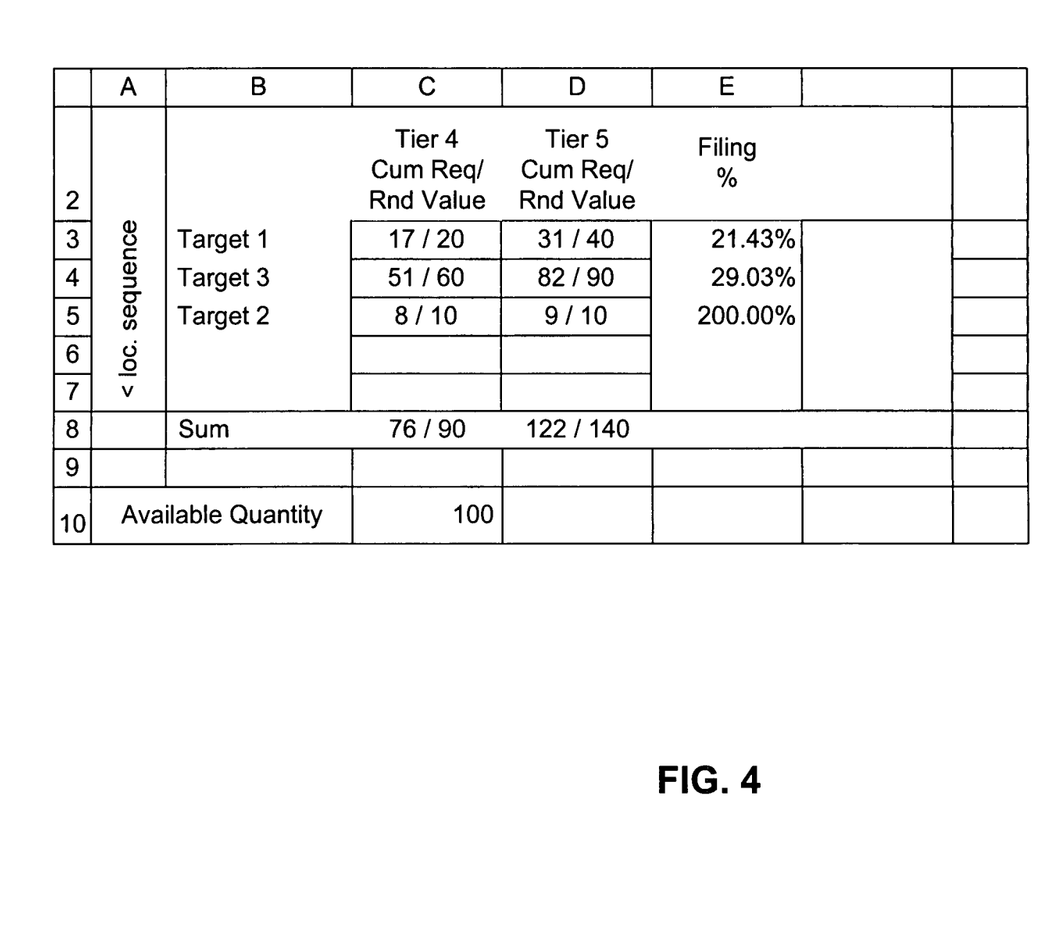
FIG. 4 illustrates an exemplary implementation of the filling percentage process, consistent with an embodiment of the present invention.

FIG. 4 illustrates an exemplary implementation of the filling percentage process consistent with an embodiment of the present invention. In this embodiment, requirements may be separated into requirement types for when the quantity of stock cannot fulfill all of the requirements. As shown in FIG. 4, as discussed above, different requirement types may be prioritized into "Tiers." For example, distribution server 180 may determine that the order of importance of each target location's stock requirements are as follows: (1) backorders held by the target location; (2) high priority fixed requirements; (3) forecasted demand over lead time; (4) safety stock; and (5) non-priority fixed requirements over lead time. Using this priority scheme as an example, these requirement types may respectively be referred to as Tier 1, Tier 2, Tier 3, Tier 4, and Tier 5. (Only Tier 4 and Tier 5 are shown in FIG. 4.) In one embodiment, to facilitate processing, the Tiers' structure and priority may be predefined and stored by server 180.

Consistent with the invention, different sequence rules may be used for each requirement type that may possibly result in a different prioritized sequence of the target locations for each requirement type. Because server 180 may prioritize the target locations in the order of which target location's requirements may be fulfilled first, the first targets in the sequence may be more likely to have their requirements met than the targets at the bottom of the sequence. In prioritizing the target locations, server 180 may prioritize according to any one or any combination of the aforementioned sequence rules including the filling percentage process sequence rule.

In general, the filling percentage process may determine a valid fair of stock elements share within a tier. For example, server 180 may round each target location's cumulated net requirements to the next higher multiple of minimum allowed pack size. The minimum allowed pack size may comprise the smallest number of stock elements that may be shipped from source 110, for example, to a target location. The minimum allowed pack size may be defined, for example, by the size of a trunk used to ship the stock elements or a pallet size used.

As shown in FIG. 4, column C indicates the Tier 4 cumulated net requirement/Tier 4 rounded cumulated net requirement. Column D indicates the Tier 5 cumulated net requirement/Tier 5 rounded cumulated net requirement. As shown in FIG. 4, the cumulated net requirement of Target 1 is 17 stock elements in Tier 4 and 31 stock elements in Tier 5. The cumulated net requirement of Target 2 is 8 stock elements in Tier 4 and 9 stock elements in Tier 5. And the cumulated net requirement of Target 3 is 51 stock elements in Tier 4 and 82 stock elements in Tier 5. If the minimum allowed pack size is 10 stock elements, for example, the Tier 4 rounded cumulated net requirement becomes 20, 10, and 60 for Targets 1, 2, and 3 respectively. Similarly, the Tier 5 rounded cumulated net requirement becomes 40, 10, and 90 for Targets 1, 2, and 3 respectively.

Next, all cumulative tier and period requirements may be rounded (for example, not just Tiers 4 and 5). Then in the filling percentage process, server 180 may decide, by examining the rounded cumulated net requirements, if priority tier processing should be used. As indicated at the bottom of columns C and D, for Tiers 4 and 5, the sum of the rounded cumulated net requirement for Targets 1, 2, and 3 are 90 and 140 respectively. Also, as shown in FIG. 4, the quantity of available stock elements (100 in this example) is between the sums of the rounded cumulated net requirements for Tier 4 and Tier 5. Accordingly, there is a shortfall for fulfilling Tiers 5's rounded cumulated net requirement, and priority tier processing may be used.

Server 180 may then determine which requirements may be met. For example, server 180 may quickly determine from the cumulative requirements that with 100 stock elements, it may satisfy the requirements of Tiers 1 to 4 for all target locations. For the ten (10) stock elements remaining, server 180 may determine how to allocate that stock among Targets 1, 2, and 3 to meet the Tier 5 requirements. Server 180, for example, may further allocate the remaining ten stock elements according to the filling percentage process.

The filling percentage process may share the available quantity to be distributed between target locations by excluding "over-saturated" target locations. A target may be over-saturated if it is allocated enough stock to meet a current tier's requirement, and also allocated enough stock, due to rounding at the current tier, to meet a subsequent tier's requirements as well. For example, as shown in FIG. 4, Target 2 has an additional (un-rounded) net requirement of 1 stock element in Tier 5, as compared to Tier 4. Due to the previous Tier 4 rounding benefits, Target 2 is over-saturated by a factor of 2/1 and may be excluded. In other words, Target 2 not only is allocated enough stock at Tier 4 to meet the Tier 4 requirements, but also, due to rounding, is allocated enough stock at Tier 4 to meet the Tier 5 requirements as well. Targets 1 and 3, however, may not be excluded because, with each of these Targets, the rounding benefits in Tier 4 are still behind the additional (un-rounded) net requirements resulting in Tier 5, respectively. In other words, while Targets 1 and 3, due to rounding, are allocated extra stock exceeding their Tier 4 requirements, the extra stock is still less than their Tier 5 requirements. Accordingly, Targets 1 and 3 may be considered for receiving stock in Tier 5.

When rounding the results of the filling percentage calculation to transportation quantities, distribution server 180 may prioritize or sort the target locations for Tier 5 based on a calculated filling percentage. The target priority may dictate how the available stock elements are to be distributed among the target locations. In order to sequence the target locations, the same filling percentage that was used for the fair share calculation that excluded some "over-saturated" location may be applied.

Target locations with a lower filling percentage are earlier in the location sequence than those having a higher filling percentage. The calculated filling percentage in Table 2, as shown below, may adhere to the following exemplary equation for Tier 5:

$$\text{Filling \%} = \frac{(\text{Tier 4 rounded cumulated net requirement} - \text{Tier 4 cumulated net requirement})}{(\text{Tier 5 cumulated net requirement} - \text{Tier 4 cumulated net requirement})}$$

TABLE 2

| Target | Calculation | Filling Percentage |
| --- | --- | --- |
| 1 | (20 − 17)/(31 − 17) | 21.43% |
| 2 | (10 − 8)/(9 − 8) | 200% |
| 3 | (60 − 51)/(82 − 51) | 29.03% |

As shown in Table 2, Target 1 has the lowest filling percentage, Target 3 has the next lowest, and Target 2 has the highest. Accordingly, the targets may be sorted as Target 1, being first, Target 3 being second, and Target 2 being third, as shown in FIG. 4.

Consequently, in sequencing locations using fair share calculations, server 180 may attempt to fill the Tier 5 requirements according to the target sequence 1, 3, 2, as shown in FIG. 4. However, because Target 3 is over-saturated in this example, it may be excluded from receiving any stock for Tier 5. Moreover, Target 3 may be in for the final rounding and there it may be put last in the location sequence because of its high filling percentage.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for distributing stock to a plurality of target locations, the method comprising the steps performed by a computer of:
    categorizing stock requirements of the plurality of target locations into a plurality of requirement types, wherein the plurality of requirement types includes at least two of:
        stock requirements to fulfill backorders;
        fixed stock requirements having a high priority;
        forecasted stock requirements over lead time;
        safety stock requirements;
        non-priority fixed requirements over lead time;
        a source location's requirements; or
        economic order quantity over the lead time;
    prioritizing the plurality of requirement types by order of importance;
    prioritizing the plurality of target locations having the same requirement type based on a sequence rule, wherein:
        the sequence rule for at least one requirement type is different than the sequence rule for at least one other requirement type; and
        the sequence rule is based on:
            a proportional basis of a fixed requirement quantity daily rate of at least one of the plurality of target locations determined by calculating fixed requirements of the at least one of the plurality of target locations divided by forecasted requirements of the at least one of the plurality of target locations; or
            a proportional basis of a safety stock daily rate of at least one of the plurality of target locations determined by calculating safety stock of the at least one of the plurality of target locations divided by forecasted requirements of the at least one of the plurality of target locations; and
    determining a distribution of the stock to the target locations based on the prioritized requirement types and the prioritized sequence of the target locations, such that the stock requirements are fulfilled from the highest priority requirement type to the lowest priority requirement type and, for each prioritized requirement type, the stock requirements are fulfilled from the highest priority target location to the lowest priority target location.

2. The method of claim 1, wherein the sequence rule defines criteria for determining the priority between target locations for receiving distributed stock.

3. The method of claim 1, wherein the sequence rule is further based on at least one of: (a) a forecasted amount of stock required by the target location beyond a lead time; (b) a lead time for the target location; (c) demand at the target location; (d) a predefined sequence order for the target location; and (e) a filling percentage process.

4. The method of claim 3, wherein the filling percentage process comprises rounding the stock requirements for each of the prioritized requirement types and the prioritized the target locations.

5. The method of claim 4, wherein the stock requirements for each of the prioritized requirement types and the prioritized the target locations are rounded to a next higher multiple of a minimum allowed pack size for the stock.

6. The method of claim 4, wherein determining the distribution of the stock further comprises excluding a current target location in a current requirement type from receiving stock if the current target location was allocated, due to rounding, enough stock to meet a previous requirement type's requirement and the current requirement type's requirements, wherein the current target location comprises one of the prioritized plurality of target locations and the current and the previous requirement types comprise ones of the prioritized plurality of requirement types.

7. The method of claim 3, wherein the filling percentage process comprises:
    establishing a cumulated net requirement and a rounded cumulated net requirement for each target location and requirement type, the rounded cumulated net requirement being equal to the corresponding cumulated net requirement rounded to a next higher multiple of a minimum allowed pack size for the stock;
    selecting a first requirement type and a second requirement type from the plurality of requirement types, wherein the available quantity of stock is sufficient to meet the rounded cumulated net requirement of the first requirement type but insufficient to meet the rounded cumulated net requirement of the second requirement type; and
    calculating, for each target location, a filling percentage configured to be used in prioritizing the plurality of target locations for the second requirement type.

8. The method of claim 7, wherein the lowest priority is given to the highest filling percentage and the highest priority is given to the lowest filling percentage.

9. The method of claim 7, wherein calculating, for each target location, a filling percentage comprises using the following equation:

$$\text{filling percentage} = \frac{(A-B)}{(C-B)}$$

where
A=the first requirement type's rounded cumulated net requirements;
B=the first requirement type's cumulated net requirements; and
C=the second requirement type's rounded cumulated net requirements.

10. The method of claim 7, wherein determining the distribution of the stock further comprises excluding a current target location in the second requirement type from receiving stock if the current target location's filling percentage is greater than or equal to 100%, wherein the current target location comprises one of the prioritized plurality of target locations.

11. The method of claim 1, wherein the stock comprises parts.

12. The method of claim 1, wherein at least one of the plurality of target locations comprise at least one of a factory, a warehouse, a retail store, a distribution center, and a bulk warehouse.

13. The method of claim 1, wherein the stock requirements comprise backorders.

14. The method of claim 1, wherein prioritizing the plurality of target locations further includes determining whether a first sequence rule resulted in identifying the priority between each target location, and applying a second sequence rule if the first sequence rule did not result in identifying the priority between each target location.

15. The method of claim 1, wherein the prioritized order of target locations for at least one requirement type is different than the prioritized order of target locations for at least one other requirement type.

16. The method of claim 1, wherein at least one of prioritizing the plurality of requirement types and prioritizing the plurality of target locations comprises using at least one of regular mail, e-mail, facsimile, the Internet, and an interactive voice response system to communicate stock requirements.

17. The method of claim 1, wherein at least one of prioritizing the plurality of requirement types and prioritizing the plurality of target locations further comprises communicating stock requirements over a network.

18. A system for distributing stock to a plurality of target locations, the system comprising:
a processor and a storage device, the storage device storing instructions that are executed by the processor, the instructions comprising:
instructions for categorizing stock requirements of the plurality of target locations into a plurality of requirement types, wherein the plurality of requirement types includes at least two of:
stock requirements to fulfill backorders;
fixed stock requirements having a high priority;
forecasted stock requirements over lead time;
safety stock requirements;
non-priority fixed requirements over lead time;
a source location's requirements; or
economic order quantity over the lead time;
instructions for prioritizing the plurality of requirement types by order of importance;
instructions for prioritizing the plurality of target locations having the same requirement type based on a sequence rule, wherein:
the sequence rule for at least one requirement type is different than the sequence rule for at least one other requirement type; and
the sequence rule is based on:
a proportional basis of a fixed requirement quantity daily rate of at least one of the plurality of target locations determined by calculating fixed requirements of the at least one of the plurality of target locations divided by forecasted requirements of the at least one of the plurality of target locations; or
a proportional basis of a safety stock daily rate of at least one of the plurality of, target locations determined by calculating safety stock of the at least one of the plurality of, target locations divided by forecasted requirements of the at least one of the plurality of target locations; and
instructions for determining a distribution of the stock to the target locations based on the prioritized requirement types and the prioritized sequence of the target locations, such that the stock requirements are fulfilled from the highest priority requirement type to the lowest priority requirement type and, for each prioritized requirement type, the stock requirements are fulfilled from the highest priority target location to the lowest priority target location.

19. The system of claim 18, wherein the sequence rule defines criteria for determining the priority between target locations for receiving distributed stock.

20. The system of claim 18, wherein the sequence rule is further based on at least one of: (a) a forecasted amount of stock required by the target location beyond a lead time; (b) a lead time for the target location; (c) demand at the target location; (d) a predefined sequence order for the target location; and (e) a filling percentage process.

21. The system of claim 20, wherein the filling percentage process comprises rounding the stock requirements for each of the prioritized requirement types and the prioritized the target locations.

22. The system of claim 21, wherein the stock requirements for each of the prioritized requirement types and the prioritized the target locations are rounded to a next higher multiple of a minimum allowed pack size for the stock.

23. The system of claim 21, wherein determining the distribution of the stock further comprises excluding a current target location in a current requirement type from receiving stock if the current target location was allocated, due to rounding, enough stock to meet a previous requirement type's requirement and the current requirement type's requirements, wherein the current target location comprises one of the prioritized plurality of target locations and the current and the previous requirement types comprise ones of the prioritized plurality of requirement types.

24. The system of claim 20, the instructions further comprising:
instructions for establishing a cumulated net requirement and a rounded cumulated net requirement for each target location and requirement type, the rounded cumulated net requirement being equal to the corresponding cumulated net requirement rounded to a next higher multiple of a minimum allowed pack size for the stock;

instructions for selecting a first requirement type and a second requirement type from the plurality of requirement types, wherein the available quantity of stock is sufficient to meet the rounded cumulated net requirement of the first requirement type but insufficient to meet the rounded cumulated net requirement of the second requirement type; and instructions for calculating, for each target location, a filling percentage configured to be used in prioritizing the plurality of target locations for the second requirement type.

25. The system of claim 24, wherein the lowest priority is given to the highest filling percentage and the highest priority is given to the lowest filling percentage.

26. The system of claim 24, wherein for each target location, the filling percentage is configured for using the following equation:

$$\text{filling percentage} = \frac{(A - B)}{(C - B)}$$

where
A=the first requirement type's rounded cumulated net requirements;
B=the first requirement type's cumulated net requirements; and
C=the second requirement type's rounded cumulated net requirements.

27. The system of claim 24, wherein determining the distribution of the stock excludes a current target location in the second requirement type from receiving stock if the current target location's filling percentage is greater than or equal to 100%, wherein the current target location comprises one of the prioritized plurality of target locations.

28. The system of claim 18, wherein the stock comprises parts.

29. The system of claim 18, wherein at least one of the plurality of target locations comprise at least one of a factory, a warehouse, a retail store, a distribution center, and a bulk warehouse.

30. The system of claim 18, wherein the stock requirements comprise backorders.

31. The system of claim 18, wherein prioritizing the plurality of target locations comprises determining whether a first sequence rule resulted in identifying the priority between each target location, and applying a second sequence rule if the first sequence rule did not result in identifying the priority between each target location.

32. The system of claim 18, wherein the stock requirements are categorized into a plurality of requirement types and the prioritized order of target locations for at least one requirement type is different than the prioritized order of target locations for at least one other requirement type.

33. The system of claim 18, wherein prioritizing the plurality of target locations comprises using at least one of regular mail, e-mail, facsimile, the Internet, and an interactive voice response system to communicate stock requirements.

34. The system of claim 18, wherein prioritizing the plurality of target locations comprises communicating stock requirements over a network.

35. A non-transitory computer-readable medium which stores a set of instructions which when executed by a processor performs a method for distributing stock to a plurality of target locations, the method executed by the set of instructions comprising the steps performed by the processor of:

categorizing stock requirements of the plurality of target locations into a plurality of requirement types, wherein the plurality of requirement types includes at least two of:
stock requirements to fulfill backorders;
fixed stock requirements having a high priority;
forecasted stock requirements over lead time;
safety stock requirements; non-priority fixed requirements over lead time;
a source location's requirements; or
economic order quantity over the lead time;
prioritizing the plurality of requirement types by order of importance;
prioritizing the plurality of target locations having the same requirement type based on a sequence rule, wherein:
the sequence rule for at least one requirement type is different than the sequence rule for at least one other requirement type; and
the sequence rule is based on:
a proportional basis of a fixed requirement quantity daily rate of at least one of the plurality of target locations determined by calculating fixed requirements of the at least one of the plurality of target locations divided by forecasted requirements of the at least one of the plurality of target locations; or
a proportional basis of a safety stock daily rate of at least one of the plurality of target locations determined by calculating safety stock of the at least one of the plurality of target locations divided by forecasted requirements of the at least one of the plurality of target locations; and
determining a distribution of the stock to the target locations based on the prioritized requirement types and the prioritized sequence of the target locations, such that the stock requirements are fulfilled from the highest priority requirement type to the lowest priority requirement type and, for each prioritized requirement type, the stock requirements are fulfilled from the highest priority target location to the lowest priority target location.

36. The non-transitory computer-readable medium of claim 35, wherein the sequence rule defines criteria for determining the priority between target locations for receiving distributed stock.

37. The non-transitory computer-readable medium of claim 35, wherein the sequence rule is further based on at least one of: (a) a forecasted amount of stock required by the target location beyond a lead time; (b) a lead time for the target location: (c) demand at the target location; (d) a predefined sequence order for the target location; and (e) a filing percentage process.

38. The non-transitory computer-readable medium of claim 37, wherein the filling percentage process comprises rounding the stock requirements for each of the prioritized requirement types and the prioritized the target locations.

39. The non-transitory computer-readable medium of claim 38, wherein the stock requirements for each of the prioritized requirement types and the prioritized the target locations are rounded to a next higher multiple of a minimum allowed pack size for the stock.

40. The non-transitory computer-readable medium of claim 38, wherein determining the distribution of the stock further comprises excluding a current target location in a current requirement type from receiving stock if the current target location was allocated, due to rounding, enough stock to meet a previous requirement type's requirement and the current requirement type's requirements, wherein the current target location comprises one of the prioritized plurality of target locations and the current and the previous requirement types comprise ones of the prioritized plurality of requirement types.

41. The non-transitory computer-readable medium of claim 37, wherein the filling percentage process comprises:
- establishing a cumulated net requirement and a rounded cumulated net requirement for each target location and requirement type, the rounded cumulated net requirement being equal to the corresponding cumulated net requirement rounded to a next higher multiple of a minimum allowed pack size for the stock;
- selecting a first requirement type and a second requirement type from the plurality of requirement types, wherein the available quantity of stock is sufficient to meet the rounded cumulated net requirement of the first requirement type but insufficient to meet the rounded cumulated net requirement of the second requirement type; and
- calculating, for each target location, a filling percentage configured to be used in prioritizing the plurality of target locations for the second requirement type.

42. The non-transitory computer-readable medium of claim 41, wherein the lowest priority is given to the highest filling percentage and the highest priority is given to the lowest filling percentage.

43. The non-transitory computer-readable medium of claim 41, wherein calculating, for each target location, a filling percentage comprises using the following equation:

$$\text{filling percentage} = \frac{(A-B)}{(C-B)}$$

where
A=the first requirement type's rounded cumulated net requirements;
B=the first requirement type's cumulated net requirements; and
C=the second requirement type's rounded cumulated net requirements.

44. The non-transitory computer-readable medium of claim 41, wherein determining the distribution of the stock further comprises excluding a current target location in the second requirement type from receiving stock if the current target location's filling percentage is greater than or equal to 100%, wherein the current target location comprises one of the prioritized plurality of target locations.

45. The non-transitory computer-readable medium of claim 35, wherein the stock comprises parts.

46. The non-transitory computer-readable medium of claim 35, wherein at least one of the plurality of target locations comprise at least one of a factory, a warehouse, a retail store, a distribution center, and a bulk warehouse.

47. The non-transitory computer-readable medium of claim 35, wherein the stock requirements comprise backorders.

48. The non-transitory computer-readable medium of claim 35, wherein prioritizing the plurality of target locations further includes determining whether a first sequence rule resulted in identifying the priority between each target location, and applying a second sequence rule if the first sequence rule did not result in identifying the priority between each target location.

49. The non-transitory computer-readable medium of claim 35, wherein the prioritized order of target locations for at least one requirement type is different than the prioritized order of target locations for at least one other requirement type.

50. The non-transitory computer-readable medium of claim 35, wherein at least one of prioritizing the plurality of requirement types and prioritizing the plurality of target locations comprises using at least one of regular mail, e-mail, facsimile, the Internet, and an interactive voice response system to communicate stock requirements.

51. The non-transitory computer-readable medium of claim 35, wherein at least one of prioritizing the plurality of requirement types and prioritizing the plurality of target locations further comprises communicating stock requirements over a network.

* * * * *